Dec. 10, 1946.  J. S. BLOOD  2,412,199
SURFACE GRINDING MACHINE
Filed Nov. 2, 1945
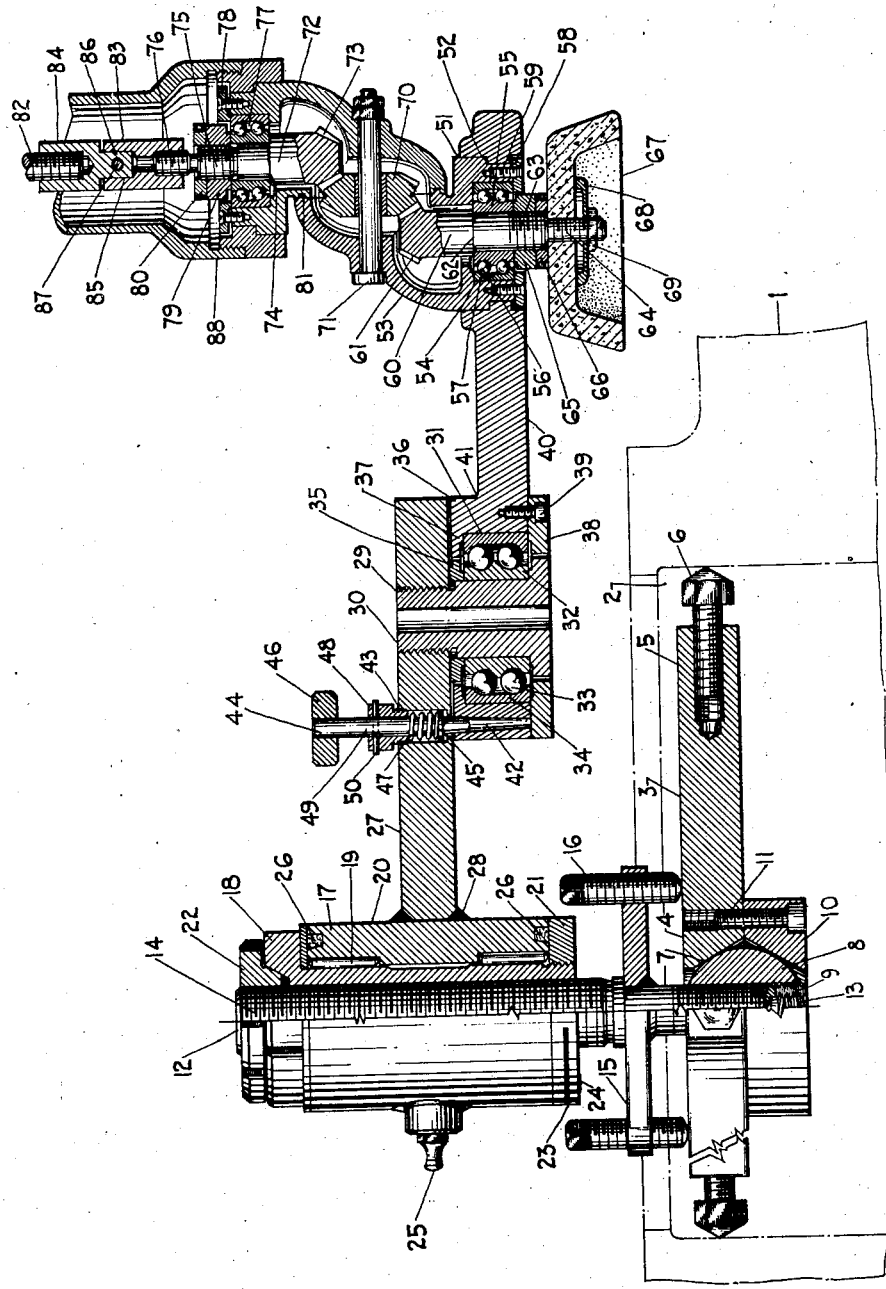
INVENTOR.
JOEL S. BLOOD
BY
ATTORNEY Patented Dec. 10, 1946

2,412,199

UNITED STATES PATENT OFFICE 2,412,199

SURFACE GRINDING MACHINE

Joel S. Blood, San Carlos, Calif.

Application November 2, 1945, Serial No. 626,418

5 Claims. (Cl. 51—241)

(Granted under the act of March 3, 1883, as amended April 30, 1928; 370 O. G. 757)

This invention relates to grinders and more particularly to mountings therefor.

Objects of the present invention are to provide for the accurate grinding of marginal edge portions of openings in walls, partitions, bulkheads and other members having openings therein; to provide an improved grinder for reducing portions of members surrounding openings therein to a predetermined plane; to provide an improved mounting for grinders adjustably embracing bounding edge portions of openings in members to be ground; to provide a mounting for grinders accurately restricting the movement of the grinders to predetermined planes of movement; to provide a grinder mounting capable of restraining grinder manipulation to circular paths of predetermined radii; to provide a mounting for a portable grinder permitting convenient manipulation of the grinder while the grinding means is maintained in a predetermined plane of movement; and to provide improved elements and arrangements thereof in a mounting of the character and for the purposes set forth.

In accomplishing these and other objects of the present invention, I have provided improved details of structure, the preferred form of which is illustrated in the accompanying drawing, wherein the simple figure is a side elevational view of the improved grinder and mounting embodying the features of the present invention, part of the device being shown in cross-section.

Referring more in detail to the drawing:

I indicates a member having an opening 2 formed therein, the bounding edge portions of said opening being a surface required to be ground.

A spider member 3 having a central body portion 4 and radially extended leg portions 5 is positioned within the opening 2. Stud bolts 6 are screw threadedly engaged to the outer end portions of the legs 5 so as to be radially extensible. The spider member 3 is secured in the opening 2 by rotating the stud bolts 6 to engage the surrounding member 1. A socket 7 is formed in the central body portion 4 of the spider 3.

A ball-shaped element 8 having a screw threaded opening 9 formed therein is positioned within the socket 7. Retaining plate 10 is secured as at 11 to the spider member 3 to retain the ball-shaped element 8 in place.

A pivot post 12 is screw threadably engaged within the opening 9 of the ball element 8. To maintain the pivot post securely in engagement within the ball 8, a locking means is provided as at 13. The pivot post 12 is provided with a male screw threaded portion 14 at its extended end portion. The pivot post mounted on the ball 8 is thereby swivelly engaged with the spider 3. To control the position of the pivot post 12, a levelling plate 15 is secured to the pivot post in a circumjacent position. Stud bolts 16 are screw threadably engaged within the levelling plate 15 in a position to engage the spider member 3 and by their adjustment, position the levelling plate and thus the pivot post 12 in relation thereto.

A roller bearing 17 having an inner race 18, rollers 19 and outer race 20 is mounted on the pivot post by the screw threaded engagement of the inner race 18 on the male screw threaded portion 14. The spaced relationship between the bearing 17 and the spider 3 is adjustable by screwing the inner race of the bearing 18 on the pivot post 12. To lock the bearing 17 in place in adjusted position, the lock nuts 21 and 22 are tightened against the bearing 17, the lock nut 22 being provided with a depending frusto-conical portion to assist in positioning the inner bearing race 18. To provide greater security the nut 21 is slotted as at 23. A stud bolt 24 is engaged within the locking nut 21 so as to compress the slot portion 23 and jam the locking nut. A lubricating opening 25 is provided through the outer race 20 of the bearing 17. Bearing seals 26 are provided to retain lubricant within the bearing.

A rigid arm member 27 is secured to the outer race 20 of the bearing 17 as at 28 in a radially extended position. The arm member is secured so as to rotate about the pivot post 12 in a plane of movement substantially at right angles to the pivot post.

A screw threaded opening 29 is formed in the outer end portion of the arm member 27 and a bearing supporting element 30 is screw threadedly engaged in the arm. A roller bearing 31 having an inner race 32, ball bearings 33, and outer race 34 is mounted on the outer extended end portion of the arm member 27 by the supporting element 30. A spacer 35 is interposed between the inner race 32 and the arm member 27. A collar 36 embraces the outer race 34 of the bearing 31 an inner flange portion 37 thereof extending between the outer race and the arm member 27. An annular plate 38 is positioned circumjacent the supporting element 30 and is secured to the collar 36 by screw threaded means as at 39. The collar 36 and plate 38 tightly embrace the outer race 34. An arm extension 40 is secured to the collar 36 as at 41 so as to pivot with the collar on the bearing supporting element 30 in a plane substantially parallel to the plane of rotation of the arm member 27.

It is sometimes desirable to lock the articulated joint so that the arm 27 and extension 40 are rigidly connected. To this end, socket openings 42 are formed in the collar 36 on the surface thereof facing the arm member 27 in a circular pattern arranged coaxially to the pivot center of the articulated joint. A receiver 43 is formed in the arm member 27 in spaced relationship to the sockets 42. A locating pin 44 is positioned within the receiver 43. The pin 44 has a spring engaging shoulder 45 and a knurled head 46 formed thereon. A spring 47 is positioned within the receiver 43 so as to bear against the shoulder 45. A spring keeper 48 is screw threadedly engaged in the opening 43 circumjacent the pin 44 so as to retain the spring 47. To maintain the pin in a disengaged position when it is desired to do so, a receiving opening 49 is formed in the pin 44 and a locking pin 50 engaged therein to hold the pin 44 in a retracted position.

An opening 51 is formed in the outer end portion of the extension 40 having a flange portion 52 inwardly disposed relative to the opening. A gear housing 53 is fitted within the opening 51 so as to rest upon the flange portion 52. A bearing receptacle portion 54 is formed in the housing 53. A ball bearing having an inner race 55, ball bearings 56, and an outer race 57 is mounted within the receptacle 54 by the engagement of the outer race therewith. To maintain the bearing in position, an annular bearing keeper 58 is screw threadedly secured to the housing 53 as at 59, the shoulder 52 being embraced by the cooperative action of the housing 53 and the bearing keeper 58.

A shaft 60 having a pinion gear portion 61, a bearing engaging shoulder 62, a screw threaded portion 63, and a grinder mounting portion 64 is rotatably mounted in the inner bearing race 55. A bearing lock nut 65 is screw threadedly engaged to the threaded portion 63 in cooperation with the shoulder 62 to embrace tightly the inner bearing race 55. A jam nut 66 is tightened against the bearing lock nut 65. A grinding wheel 67 is mounted on the mounting portion 64 of the shaft 60. A grinding wheel washer 68 and a jam nut 69 are employed to secure the grinding wheel 67 in place. A double faced bevelled gear 70 is mounted within the housing 53 to cooperatively engage the gear portion 61. A pin 71 is employed to rotatably mount the gear 70 within the housing 53 on an axis of rotation substantially at right angles to the axis of rotation of the gear portion 61. A shaft 72 having a pinion gear portion 73, a bearing embracing shoulder 74, a screw threaded portion 75, and a male coupling portion 76 is mounted within the housing 53 in a position engaging the pinion gear portion 73 with the opposite face of the bevelled gear 70 from that engaged by the bearing portion 61, the axis of rotation of the shaft 72 being substantially at right angles to the axis of rotation of the gear 70. A roller bearing 77 is employed to mount the shaft 72 within the housing 53. An annular bearing retaining plate 78 is secured to the housing 53 so as to bear against the outer race of the bearing 77 and so maintain the bearing in position. A lock nut 79 and a jam nut 80 are screw threadably engaged to the shaft 72 as at 75 in cooperation with the shoulder 74 to tightly embrace the inner race of the bearing 77.

The gear portion 61, the gear 70 and the gear portion 73 are cooperatively engaged to comprise a universal coupling permitting swivel movement of the shaft 72 in relation to the shaft 60 without interrupting the communication therebetween. To permit this freedom of motion it has been found necessary to sever the housing 53 as at 81. The severed housing at 81 is provided with cooperatively engaged tongue and groove portions to guide the movement of one portion of the housing 53 on the other. Rotation of the housing in the plane of the arm member 27 and extension 40 is permitted by the movement of the housing 53 and the keeper 58 within the opening 51.

A driving spindle of a conventional prime mover, not shown, is indicated at 82.

To connect the driving spindle 82 to the connecting portion 76 of the shaft 72, coupling elements 83 and 84 are provided. The coupling 83 is screw threadedly engaged to the male coupling portion 76. The coupling 84 is screw threadedly engaged to the spindle 82. The coupling 83 has a recess 85 formed in the end thereof. The coupling 84 has a projecting stud portion 86 formed on the end thereof. The stud 86 is engaged within the opening 85. To maintain this engagement a taper pin 87 is passed through juxtaposed openings in the coupling 83 and the stud 86. The stud 86 is made of a diameter slightly smaller than the opening 85 in which it engages. This difference in size imparts a flexibility to the coupling of the prime mover to the shaft 72.

A housing 88 for the connection of the spindle 82 to the shaft 72 is screw threadably engaged to the housing 53.

Operation

The operation of a grinder constructed as described is as follows:

The spider 3 is positioned within the opening 2 and locked in place by rotating the stud bolts 6 outwardly to engage the member 1. The spider 3 is preferably secured in a plane substantially parallel to the surface of the member 1 to be ground, the pivot post 12 being positioned substantially in the center of the opening 2.

The pivot post 12 being swivelly supported in the spider member 3 by means of the ball element 8, said pivot post 12 is positioned substantially at right angles to the surface of the member 1 to be ground by adjusting the stud bolts 16 to secure the levelling plate 15 in selected spaced relationship to the spider 3.

The inner race 18 of the bearing 17 is rotated on the pivot post 12 to adjust the height of the grinding wheel 67 supported thereby. The lock nut 21 is tightened into place and secured by tightening the stud bolt 24. The lock nut 22 is also tightened into place, its conical portion engaging the inner race 18 of the bearing 17.

When it is desired to have the grinding wheel 67 conform to a circular path, the radius of rotation thereof is determined by the distance between the grinding wheel 67 and the pivot post 12. This distance is controlled by locking the articulated joint between the arm member 27 and the extension 40. The articulated joint is locked by permitting the spring loaded locating pin 44 to engage in a selected socket 42 giving the desired radius of rotation.

When it is desired, movement of the grinding wheel 67 may be restricted to movement in a predetermined plane without the circular limitation. To accomplish this, the locating pin 44 is disengaged from the socket and held in such disengaged position by inserting the locking pin 50 to hold the locating pin in retracted position.

When the locating pin 44 is thus disengaged, the extension 40 is free to pivot on the arm member 27 and the predetermined plane of the grinding wheel may be manually traversed at will.

The communication of the driving force through the gear and shaft arrangement previously described from the prime mover to the grinding wheel 67 permits swivel movement of the spindle 82 and prime mover in relation to the mounting therefor. This swivel movement permits the convenient manual manipulation of the grinder and enables grinding to be accomplished in restricted spaces.

As the grinding of the member 1 progresses, the grinder is lowered by readjusting the inner race 18 of the bearing 17 on the pivot post 12.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. An apparatus for use with a portable motor comprising a spider member comprising a central body portion having a socket formed therein, a plurality of leg elements radially extended from the body portion, adjustment studs screw-threadedly engaged in the outer ends of the leg elements so as to be outwardly extensible; a ball element supported in the socket of the body portion; a retaining plate secured to the body portion to maintain the ball member in the socket; a pivot post screw-threadedly engaged to the ball member and swivelly supported thereby; a leveling plate transversely secured circumjacent the pivot post; a plurality of adjustment studs screw-threadedly engaged in the leveling plate in a position to engage the spider member and in cooperation therewith to maintain the pivot post in selected position; a radial arm member; a roller bearing screw threadedly mounted on the pivot post spacially adjustable thereon in relation to the spider member and rotatably supporting the arm member in a plane substantially at right angles to the pivot post; an articulated joint in the arm member permitting the pivoting of the outer end portion of the arm member in a plane substantially parallel to the rotation plane of the arm member; sockets and a spring loaded catch in spaced relation thereto in opposite arm portions to lock the articulated joint at selected points of adjustment; a grinding wheel; a mounting shaft for the grinding wheel; a bearing engaged in the outwardly extended end portion of the arm member to support the mounting shaft substantially at right angles to the plane of rotation of the arm member; a universal coupling means engaged to the mounting shaft; and a coupling member for connecting the universal gear means to the driving means of the motor.

2. A grinder adapted for use with a motor comprising a spider member having extensible leg portions for tightening the spider member in place within openings in members whose surrounding material is to be ground, a universal joint mounted in the spider member, a pivot post swivelly supported by the universal joint, a leveling plate secured to the pivot post in circumjacent relation thereto, adjustment means borne by the leveling plate for embracing the spider and positioning the pivot post, a radial arm member rotatably supported by the pivot post in a plane substantially at right angles to the pivot post, screw threaded means on pivot post and arm member for adjusting the height on the pivot post at which the arm member is permitted to rotate, an articulated joint in the arm member permitting the outwardly extended end portion thereof to pivot in a plane substantially parallel to that of the rotation of the arm member, a grinding wheel rotatably supported in the outwardly extended end portion of the arm member, and a universal joint communicating between the driving means of the motor and the grinding wheel.

3. In a grinder mounting of the character described, a spider member having extensible leg portions for mounting the spider in openings in members whose surrounding material is to be ground, a universal joint mounted in the spider member, a pivot post swivelly supported by the universal joint, adjustment means for positioning the pivot post in relation to the spider member, a radial arm member rotatably mounted on the pivot post to swing in a plane substantially at right angles to the pivot post, means on the pivot post for adjusting the location on the pivot post at which the arm member is permitted to rotate, an articulated joint in the arm member, a grinding wheel rotatably mounted in the extended end portion of the arm member, and a universal coupling providing communication between a prime mover and the grinding wheel to rotate the grinding wheel in a plane determined by the adjustment of the arm member on the pivot post.

4. A grinder comprising a spider member having extensible leg portions, a pivot post swivelly mounted in the spider member, an arm member rotatably mounted on the swivel post, means for adjusting the plane of rotation of the arm member in relation to the spider member, an articulated joint in the arm member, a grinding wheel supported in the outwardly extended end portion of the arm member, a driving means for the grinding wheel, and a universal coupling interposed between the driving means and grinding wheel permitting freedom of movement of the driving means while the grinding wheel is maintained in a predetermined plane.

5. A grinder comprising a mounting means engageable in openings in members to be ground, a pivot post swivelly supported by the mounting means, a radial arm member rotatably mounted on the pivot post, means for adjusting the plane of rotation of the arm member in relation to the mounting means, a grinding wheel rotatably supported by the extended end portion of the arm member, means for varying the distance from the grinding wheel to the pivot post and a driving means supported by the arm member in communication with the grinding wheel.

JOEL S. BLOOD.